(12) United States Patent
Um et al.

(10) Patent No.: US 7,545,407 B2
(45) Date of Patent: Jun. 9, 2009

(54) METHOD OF RECORDING STILL PICTURES ONTO A RECORDING MEDIUM

(75) Inventors: Soung Hyun Um, Anyang-si (KR); Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1219 days.

(21) Appl. No.: 10/327,472

(22) Filed: Dec. 24, 2002

(65) Prior Publication Data

US 2003/0118327 A1 Jun. 26, 2003

(30) Foreign Application Priority Data

Dec. 24, 2001 (KR) ............... 10-2001-0083903

(51) Int. Cl.
H04N 5/225 (2006.01)
H04N 7/00 (2006.01)
H04N 5/76 (2006.01)
H04N 5/46 (2006.01)
H04N 5/00 (2006.01)

(52) U.S. Cl. ............... 348/207.99; 348/231.2; 348/231.3; 348/552; 348/555; 348/558; 386/83; 386/117; 386/120

(58) Field of Classification Search ............... 348/6, 348/7, 10, 12, 13, 231.2–231.9, 272, 373, 348/375, 552, 211.3, 211.99, 211.11; 386/46, 386/83, 117, 120, 124

See application file for complete search history.

(56) References Cited

U.S. PATENT DOCUMENTS 6,115,035 A 9/2000 Compton et al.

(Continued)

FOREIGN PATENT DOCUMENTS

CN 1263672 A 8/2000

(Continued)

OTHER PUBLICATIONS

Chinese Office Action, issued Sep. 19, 2008.*

(Continued)

*Primary Examiner*—Thai Tran
*Assistant Examiner*—Mishawn Dunn
(74) *Attorney, Agent, or Firm*—Birch, Stewart, Kolasch & Birch, LLP

(57) ABSTRACT

The present invention relates to a method of recording still pictures and audio data onto a rewritable recording medium. The present method records still-picture video and audio files of the recording format of a digital till camera under a subdirectory of a DCIM (Digital Camera IMages) directory of DCF (Design rule for Camera File system) and still-picture video and/or audio files of the recording format of a disk video recorder under a subdirectory of a moving-picture directory, creates management information for searching and presentation control of the still-picture video and audio files below the DCIM directory and the still-picture video and/or audio files below the moving-picture directory, and records the created management information under another subdirectory of the moving-picture directory. Thus, efficient and convenient file management is possible through a single recording medium, which results in remarkable improvement of use convenience of a motion picture recorder and a digital still camera.

18 Claims, 6 Drawing Sheets

U.S. PATENT DOCUMENTS

| | | |
|---|---|---|
| 6,122,436 A | 9/2000 | Okada et al. |
| 6,816,189 B2 * | 11/2004 | Nagaoka et al. .......... 348/231.2 |
| 6,999,674 B1 | 2/2006 | Hamada et al. |
| 7,107,516 B1 * | 9/2006 | Anderson et al. ........ 715/501.1 |
| 7,158,175 B2 * | 1/2007 | Belz et al. ................ 348/231.3 |
| 2001/0040862 A1 | 11/2001 | Ando et al. |
| 2005/0063669 A1 | 3/2005 | Kato et al. |

FOREIGN PATENT DOCUMENTS

| | | |
|---|---|---|
| CN | 1300022 A | 6/2001 |
| CN | 1310445 A | 8/2001 |
| CN | 1276605 A | 9/2004 |
| EA | 1 059 635 A2 | 12/2000 |
| EP | 1 107 103 A3 | 6/2001 |
| EP | 1 209 680 A1 | 5/2002 |
| JP | 09-097490 A | 4/1997 |
| JP | 11-191282 A | 7/1999 |
| JP | 2000-004421 A | 1/2000 |
| JP | 2000-041212 A | 2/2000 |
| JP | 2000-287163 A | 10/2000 |
| JP | 2000-333126 A | 11/2000 |
| JP | 2001-157146 A | 6/2001 |
| JP | 2001-157155 A | 6/2001 |
| JP | 2001-169241 A | 6/2001 |
| JP | 2001-211418 A | 8/2001 |
| JP | 2001-216739 A | 8/2001 |
| KR | 10-2000-0004856 | 1/2000 |
| KR | 10-2000-0006198 | 1/2000 |
| KR | 2001-0050627 A | 6/2001 |
| WO | WO 01/11626 A1 | 2/2001 |
| WO | WO-01/82604 | 11/2001 |
| WO | WO-01/82605 | 11/2001 |
| WO | WO-01/82606 | 11/2001 |
| WO | WO-01/82608 | 11/2001 |
| WO | WO-01/82609 | 11/2001 |
| WO | WO-01/82610 | 11/2001 |
| WO | WO-01/82611 | 11/2001 |

OTHER PUBLICATIONS

"Archos Jukebox Multimedia—MP3 & Movie Mediabox," Robert Menta, MP3newswire.net, Dec. 14, 2001.

"Design rule for Camera File System," Japan Electronic Industry Development Association Standard, Dec. 1998, Version 1.

* cited by examiner

METHOD OF RECORDING STILL PICTURES ONTO A RECORDING MEDIUM

This nonprovisional application claims priority under 35 U.S.C. §119(a) on Patent Application No. 01-83903 filed in KOREA on Dec. 24, 2001, which is herein incorporated by reference.

BACKGROUND OF THE INVENTION

1. Field of the Invention

The present invention relates to a method of recording still pictures and audio data onto a rewritable recording medium.

2. Description of the Related Art

A disk-type recording medium such as a compact disk (CD) can store high-quality digital audio data permanently, so that it is very popular recording medium. Recently, a digital versatile disk (referred as 'DVD' hereinafter) has been developed as a new disk-type recording medium. A DVD can store much larger size than a CD, thus, high-quality moving picture or audio data are recorded on a DVD for much longer time. Therefore, a DVD will be used widely in the near future.

There are three types of a DVD, DVD-ROM for read-only, DVD-R for write-once, and DVD-RAM or DVD-R/W for rewritable. For a rewritable DVD, the standardization of data writing format is being finished.

In these days, a digital TV broadcast being capable of carrying TV programs of HD (High-Definition) quality is in service. Thus, a new high-density recording medium is being developed to record digital TV programs of such quality. The new high-density recording medium targets about 23 GBytes in storage capacity that is about five times of a DVD. Standardization of application specification of that recording medium is in progress among several related companies. If the high-density recording medium is commercialized in near future, motion picture data and many still pictures can be stored on a single high-density recording medium.

In addition, a Digital Still Camera (DSC) being capable of storing a taken picture in the form of digital data has been developed recently. Such a DSC usually has a memory chip of large storage capacity so that it can take high-quality pictures and store audio data associated with the stored pictures as well. In a DSC, the taken pictures are encoded in the format of JPEG, or TIFF while the audio data are done in the format of PCM, u-Law PCM, or IMA-ADPCM.

A DSC has a well-known file system called DCF (Design rule for Camera File system) for recording still pictures and audio data. FIG. 1 shows an illustrative DCF. In the structure of DCF, a DCIM (Digital Camera IMages) directory exists under a root directory and many subdirectories may exist under the DCIM. Each subdirectory has 8-digit-long filename that is composed of three numeric digits and five character digits. The three numeric digits should be unique, for instance, one among 100-999, and the five character digits are arbitrarily chosen by a user. Because the three numeric digits are unique the subdirectories can be created up to 900.

A subdirectory, e.g., subdirectory '100ABCDE' of FIG. 1 can accommodate many data files of which filename is 8-digits long. The filename is composed of four numeric digits and four character digits. While the four character digits are chosen by a user the four numeric digits should be unique among data files if their attributes are different. The data files are still pictures and/or audio files, respectively. The still picture files have extension of 'JPG' or 'TIF' while the audio files encoded by PCM, u-Law PCM or IMA-ADPCM have extension of 'WAV'. The filenames of the data files can be same if their extensions are different. Therefore, when a picture file is to be index with audio, an index audio file can be linked with the picture file only if their filenames are made same.

By the way, a disk video recorder (DVR), which has been developed recently, can record still pictures and audio data as well as motion pictures onto a disk recording medium. If a DVR adopts its file recording structure being able to improve compatibility with a DSC for still picture and audio data, a user can move or copy between a DVR and a DSC without any data conversion or any data converting tool or with a very simple converting tool. This will improve use convenience of the two electronic machines remarkably.

SUMMARY OF THE INVENTION

It is an object of the present invention to provide several methods that record still pictures and audio data onto a recording medium for storing motion-picture data in a file structure compatible with DSC's file structure.

It is another object of the present invention to provide several methods enabling a file structure of a recording medium specified for motion picture data to accommodate still pictures and audio data.

A method of recording still pictures onto a recording medium in accordance with the present invention is characterized in that it comprises the steps of: recording still-picture video and audio files of a DSC's recording format under a subdirectory of the first directory and still-picture video and/or audio files of a DVR's recording format under a subdirectory of the second directory other than the first directory; creating management information for searching and presentation control of the still-picture video and audio files under the subdirectory of the first directory and the still-picture video and/or audio files under the subdirectory of the second directory; and recording the created management information under another subdirectory of the second directory.

Another method of recording still pictures onto a recording medium in accordance with the present invention is characterized in that it comprises the steps of: recording still-picture video and audio files under a subdirectory of the first directory; creating management information for searching and presentation control of the still-picture video and audio files under the subdirectory of the first directory; and recording the created management information under a subdirectory of the second directory.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein:

FIG. 2 is a block diagram of a disk video recorder which a method of recording still pictures onto a rewritable recording medium in accordance with the present invention is embedded in.

DETAILED DESCRIPTION OF THE PREFFERRED EMBODIMENT

In order that the invention may be fully understood, a preferred embodiment thereof will now be described with reference to the accompanying drawings.

Figure 2:
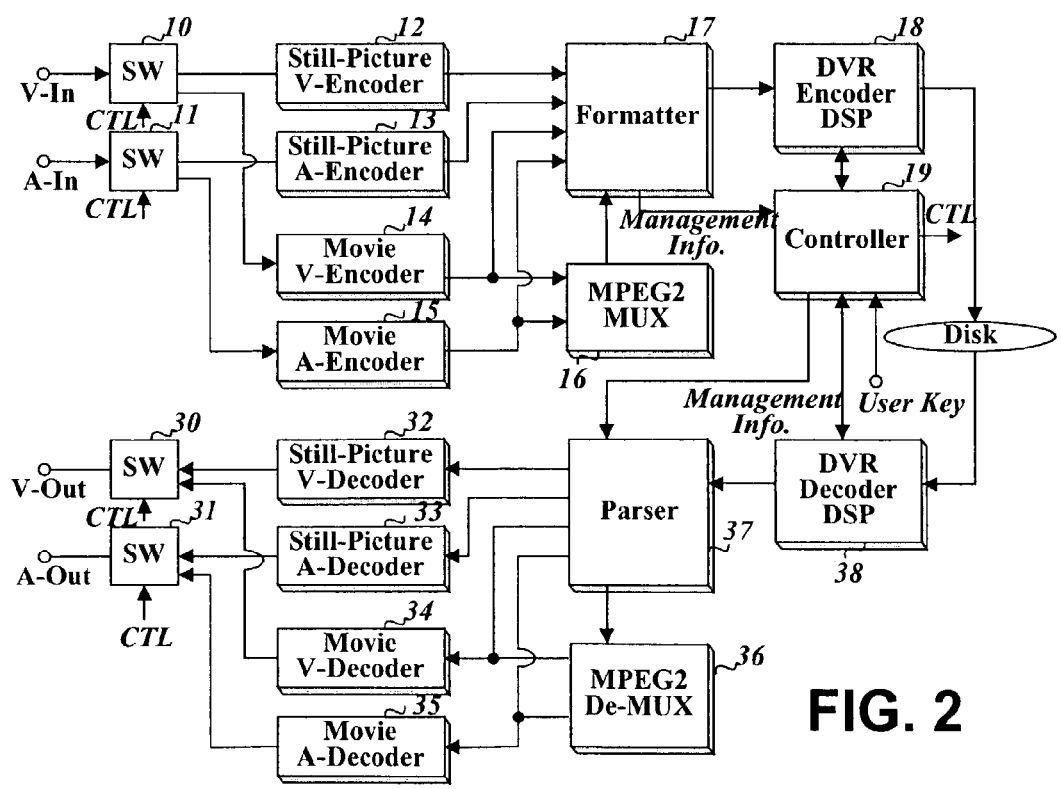

FIG. 2 is a block diagram of a disk device which a method of recording still pictures onto a rewritable recording medium in accordance with the present invention is embedded in.

The disk device of FIG. 2, e.g., a DVR can record video/audio data and management information for searching and reproduction control onto a rewritable recording medium.

The disk device comprises, as shown in FIG. 2, an input processing module, an output processing module, and a controller 19 conducting overall system control. The input processing module is composed of two input switching units 10 and 11, a still picture video 12 and a still picture audio encoder 13, a movie video 14 and a movie audio encoder 15, an MPEG 2 muxer 16, a formatter 17, and a DVR encoding DSP 18 while the output processing module is composed of two output switching units 30 and 31, a still picture video 32 and a still picture audio decoder 33, a movie video 34 and a movie audio decoder 35, an MPEG 2 demuxer 36, a parser 37, and a DVR decoding DSP 38.

The two input switching units 10 and 11 selectively connect their input signals to the still picture video 12 and the still picture audio encoder 13 or the movie video 14 and the movie audio encoder 15 in response to a switching control 'CTL' of the controller 19. The still picture encoders 12 and 13 encode video data from the first switching unit 10 to JPEG or TIFF format and audio data from the second switching unit 11 to PCM, u-Law PCM, or IMA-ADPCM format, respectively as a DSC does.

The movie encoders 14 and 15 encode video data from the first switching unit 10 to MPEG 2 format and audio data from the second switching unit 11 to AC-3, MPEG 1 layer 2, or LPCM format, respectively. The MPEG 2 muxer 16 multiplexes the encoded video and audio data from the movie video 14 and the movie audio encoder 15 to produce MPEG 2 stream that is directed to the formatter 17.

In case that the encoded still picture video and audio data are inputted from the still picture encoders 12 and 13, the formatter 17 segments or groups input data to yield successive data units, adds necessary head information to each data unit, and transmits them sequentially to the DVR encoding DSP 18. The data unit has a size suitable for a recording unit area of a rewritable recording disk. The formatter 17 also produces management information for searching for and controlling reproduction of the re-sized still picture video and/or audio data. The produced management information is delivered to the controller 19.

In case that the encoded motion picture video and audio data are inputted from the movie encoders 14 and 15 and the MPEG 2 stream are from the MPEG 2 muxer 16 at the same time, the formatter 17 selects the encoded data or the MPEG 2 stream to segment or group the selected data to yield successive data units, adds necessary head information to each data unit, and transmits them sequentially to the DVR encoding DSP 18. The data unit has a size suitable for a recording unit area of a rewritable recording disk. The formatter 17 also produces management information for searching for and controlling reproduction of the re-sized motion picture video and/or audio data. The produced management information is delivered to the controller 19.

The DVD encoding DSP 18 constructs ECC (Error Correction Code) blocks with the successive data units having still or motion pictures and audio data and then modulates data of ECC blocks to corresponding recording waveforms that will form mark/space patterns on the surface of the rewritable recording disk. At this time, the controller 19 controls data recording of the DVR encoding DSP 18 in accordance with the data type being recorded. That is, the controller 19 determines recording location, file and directory to record data, and so on based data type being recorded. If needed, information entered by a user is used.

In addition, while or after video and/or audio data are recorded, the controller 19 records the management information received from the formatter 17 onto the rewritable recording disk through the DVR encoding DSP 18.

Below described are various file structures of a rewritable recording medium that the above-explained recording processes are conducted onto.

Figure 3:
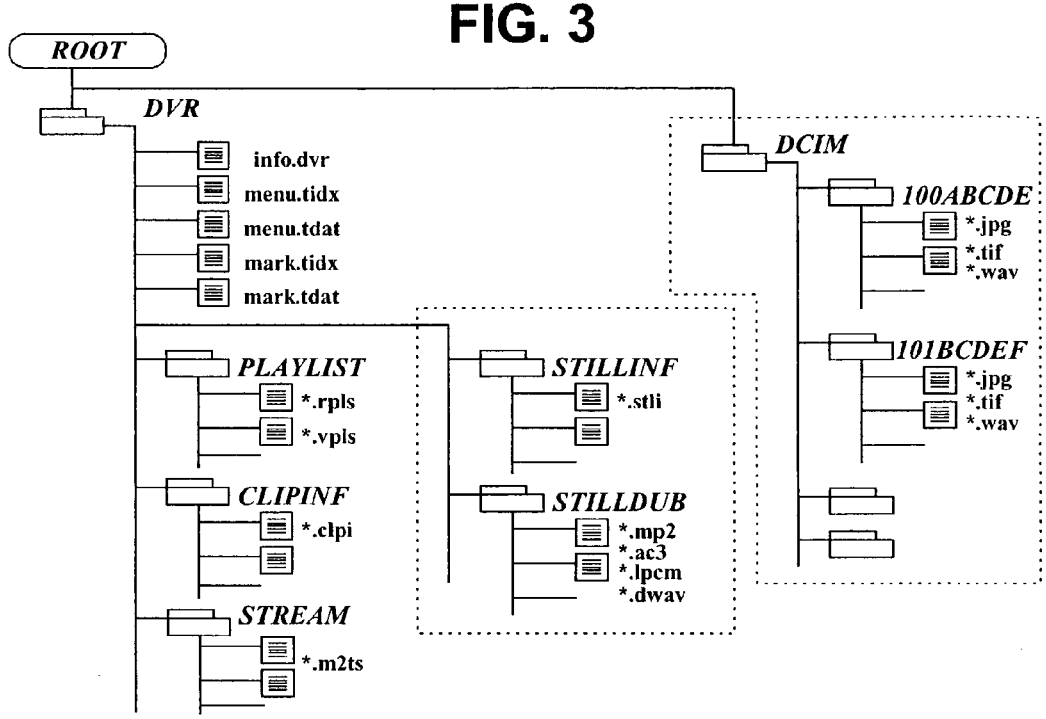
FIGS. 3 to 11 show data recording structures of a motion-picture recording medium in accordance with respective embodiments of the present invention.

FIG. 3 is a data recording structure of a motion-picture recording medium in accordance with the first embodiment of the present invention. This embodiment has a sub file structure for still pictures and audio data that is equivalent to DCF specified for a DSC.

In the recording structure of FIG. 3, there is a 'DVR' directory under a root directory. The 'DVR' directory is mandatory for motion picture recording of a disk video recorder. The 'DVR' directory has directories 'PLAYLIST', 'CLIPINF', 'STREAM', and so forth. The 'PLAYLIST' directory includes playlist files (*.rpls,*.vpls) containing motion-picture and still-picture play items and title management information. The directory 'CLIPINF' includes clip information files (*.clpi) containing information on movie stream management and movie attribute and the directory 'STREAM' includes stream files (*.m2ts) containing actual motion-picture data stream packets.

The DCF structure adopted by a DSC also exists under the root directory. That is, a DCIM directory is located under the root directory and many subdirectories may exist under the DCIM. Each subdirectory has 8-digit-long filename that is composed of three numeric digits and five character digits. The three numeric digits should be unique, for instance, one among 100-999, and the five character digits are arbitrarily chosen by a user. Because the three numeric digits are unique the subdirectories can be created up to 900.

Figure 1:
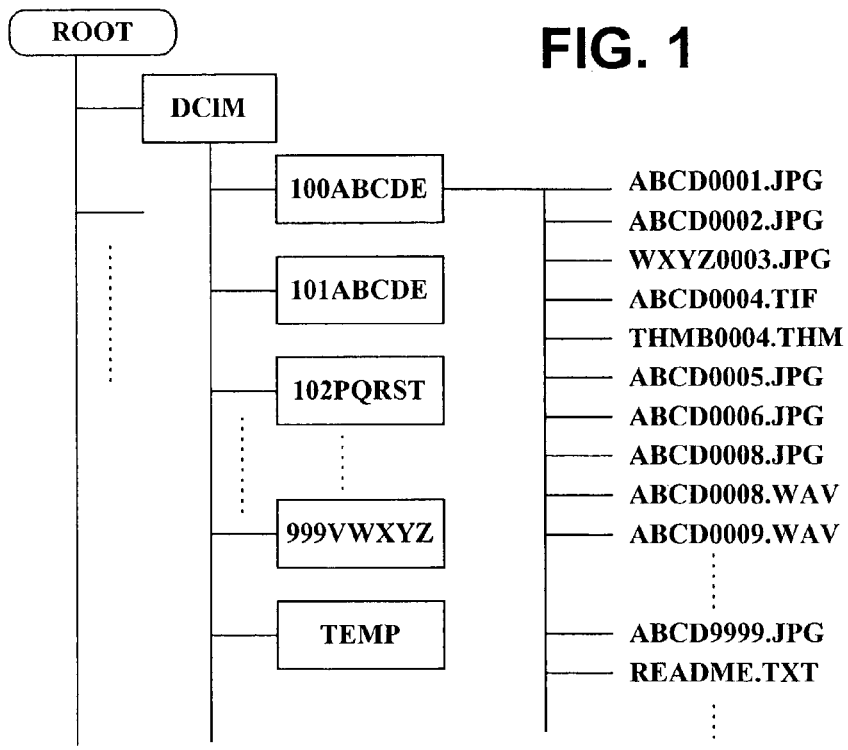
FIG. 1 shows an illustrative DCF (Design rule for Camera File system) adopted by a digital still camera.

A subdirectory, e.g., subdirectory '100ABCDE' of FIG. 1 can accommodate many data files of which filename is 8-digits long. The filename is composed of four numeric digits and four character digits. While the four character digits are chosen by a user the four numeric digits should be unique among data files if their attributes are different. The data files are still pictures and/or audio files, respectively. The still picture files have extension of 'JPG' or 'TIF' while the audio files encoded by PCM, u-Law PCM or IMA-ADPCM have extension of 'WAV'. The data files can be named same if their extensions are different. Therefore, when a picture file is to be indexed with sound, an index audio file containing that sound can be linked with the picture file only if their filenames are made same.

After still pictures and/or audio data are recorded as above, the controller 19 records, under the 'DVR' directory, management information for search and presentation control of the recorded files under the DCIM. That is, the controller 19 creates a still-picture management file (*.stli) containing management information for search and presentation control of the still picture video and audio files under the 'STILLINF' subdirectory of the 'DVR' directory.

The still picture video files (*.jpg, *.tif) and audio files (*.wav) are referred by information written in the still-picture management file (*.stli) and can be made presentation in accordance with information written in the management file.

In addition, the controller 19 can record dubbing audio files (*.mp2,*.ac3,*.lpcm,*.dwav) linked with a picture or pictures under a subdirectory 'STILLDUB' of the 'DVR' directory. Each dubbing audio file includes audio data encoded by MPEG1 layer 2, AC-3, or LPCM that is the encoding format of a DVR. In this case, management information for search and presentation control of the dubbed audio files is further included in the management file (*.stli) under the subdirectory 'STILLINF'.

If a recording medium of which files are organized as FIG. 3 is inserted, the controller 19 examines title management information and all playlist files (*.rpls,*.vpls) including motion-picture/still-picture play items that are under the subdirectory 'PLAYLIST', first. Then, it reads a motion-picture stream file (*.m2ts) under the subdirectory 'STREAM' indicated by a motion-picture play item chosen by a user and decodes out stream data contained in the stream file. This is a general motion-picture reproduction operation.

During the motion-picture reproduction, the controller 19 controls the DVR decoding DSP 38, the parser 37, and the movie video 34 and the movie audio decoder 35 appropriately. The output switching units 30 and 31 are also controlled by the controller 19 to select signals from the movie video 34 and the movie audio decoder 35 to output.

The controller 19 may refer to the still-picture management file (*.stli) under the subdirectory 'STILLINF' based on which type of play item is included in the playlist files (*.rpls, *.vpls). In other words, the controller 19 searches for and presents sequentially still-picture video files and/or audio files, pointed by a still-picture play item, under a certain subdirectory of the DCIM directory with reference to information written in the still-picture management file. For conducting this presentation, the controller 19 controls the DVR decoding DSP 38, the parser 37, and the still-picture video 32 and the still-picture audio decoder 33 appropriately. The output switching units 30 and 31 are also controlled by the controller 19 to select signals from the still-picture video 32 and the still-picture audio decoder 33 to output.

If the still-picture management file (*.stli) under the subdirectory 'STILLINF' indicates that a still-picture video file being decoded is associated with a dubbed audio file under the subdirectory 'STILLDUB', the controller 19 controls the DVR decoding DSP 38 and the parser 37 to reproduce that dubbed audio file as well.

As described before, if the file structure of FIG. 3 is adopted by a DVR for recording still-picture video and audio files onto a recording medium, the still-picture video and audio files in DCF structure on that recording medium can be read directly by a DSC. Furthermore, if still pictures taken and audio data recorded by a DSC are copied onto a recording medium without any change of their file scheme, those contents on the recording medium can be read by a DVR after searching them.

In the above embodiment, the length of each subdirectory name 'PLAYLIST', 'CLPIINF', 'STREAM', 'STILLINF', or 'STILLDUB' is not longer than eight, however, other length and name can be used.

Figure 4:
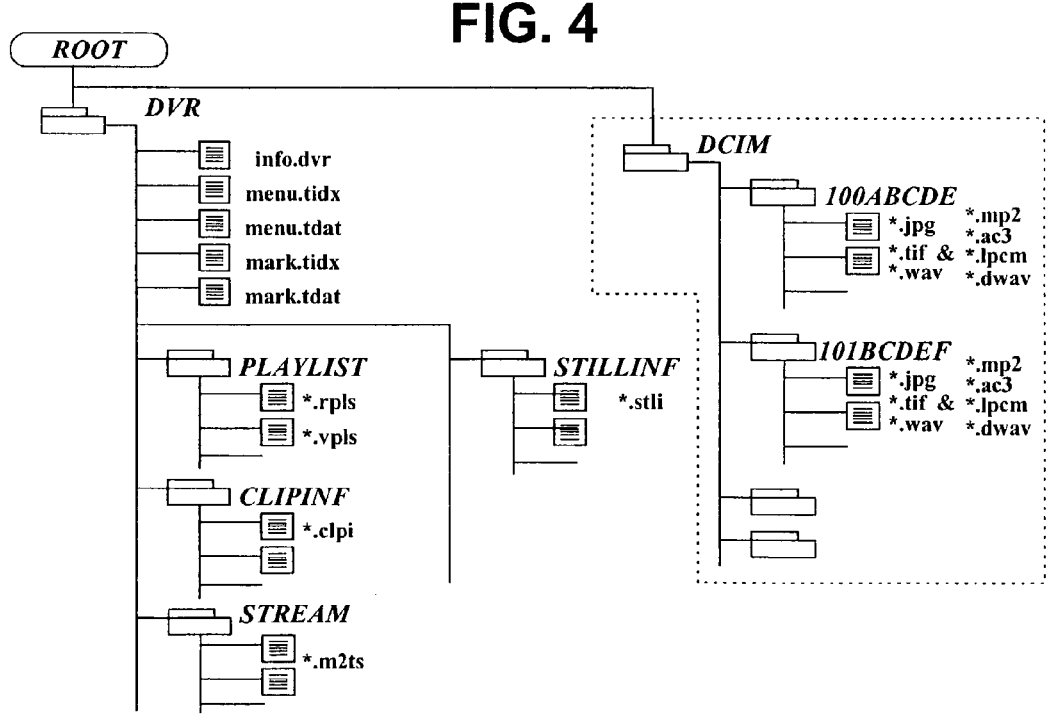

FIG. 4 is a data recording structure of a motion-picture recording medium in accordance with the second embodiment of the present invention. This embodiment has a sub file structure for still pictures and audio data that is equivalent to DCF as the first embodiment of FIG. 3.

The second embodiment of FIG. 4 is different from the first embodiment of FIG. 3 in that audio data files, for example, dubbing audio files (*.mp2,*.ac3,*.lpcm,*.dwav) whose data are encoded by MPEG 1 layer 2, AC-3, or LPCM, which is the recording format of a DVR, exist under a certain subdirectory of the DCIM directory. In this case, each audio file is stored under a subdirectory including its associated still-picture file and is named with its associated still-picture file. The controller 19 creates a still-picture management file (*.stli) further containing information for search and presentation control of audio files in every subdirectory and records it under the subdirectory 'STILLINF'.

Other structure and features not mentioned here are same with the first embodiment of FIG. 3.

Figure 5:
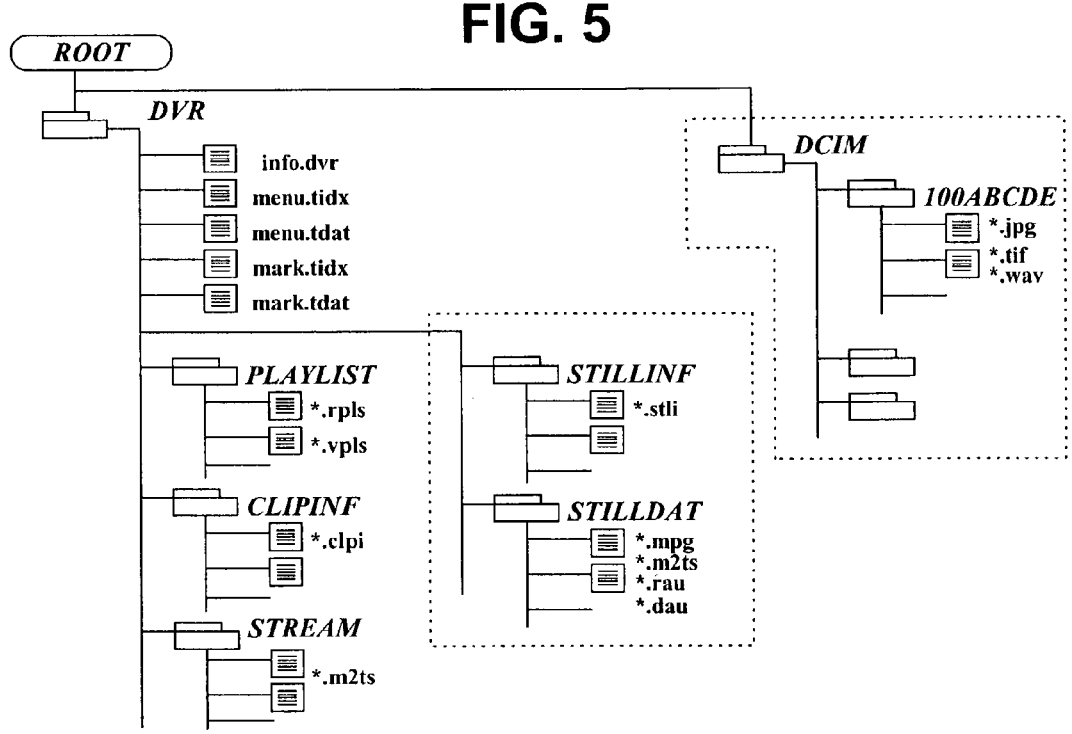

FIG. 5 is a data recording structure of a motion-picture recording medium in accordance with the third embodiment of the present invention. This embodiment has a sub file structure for still pictures and audio data that is equivalent to DCF as the first embodiment of FIG. 3.

The third embodiment of FIG. 5 is different from the first embodiment of FIG. 3 in that still pictures are recorded under the subdirectory 'STILLDAT' of the 'DVR' directory in the DVR-recognizable formats, namely, I-picture format (*.mpg) of MPEG standard, and picture-mixed MPEG 2 transport stream format (*.m2ts) while audio data are also recorded thereunder in the file formats of real audio (*.rau) and dubbing audio (*.dau). In this embodiment, dubbing audio data that have not been written under a subdirectory of the DCIM directory in association with a picture or pictures may be written under the subdirectory 'STILLDAT'.

The controller 19 creates a still-picture management file (*.stli) containing information for search and presentation control of still-picture files and audio files below the directories 'DVR' and 'DCIM' and records it under the subdirectory 'STILLINF' of the 'DVR' directory.

Thus, a DVR is able to search for and to present a still-picture video or a still-picture audio file below the directory 'DVR' or 'DCIM' with reference to the still-picture management file (*.stli) under the subdirectory 'STILLINF' while a DSC is able to present still-picture files and/or audio files below the directory 'DCIM' The presentation operation for a recording medium of which file scheme is organized as FIG. 5 is conducted the same as explained for the first embodiment of FIG. 3.

The contents of the real audio files (*.rau) and the dubbing audio files (*.dau) can be included in the still-picture video files of MPEG I-picture format (*.mpg) or MPEG2 transport stream format (*.m2ts) under the subdirectory 'STILLDAT'. In addition, dubbing audio data may be divided into one part being written below the directory 'DCIM' and the other part being written below the subdirectory 'STILLDAT'.

All of the files under the separate subdirectories 'STILLDAT' and 'STREAM' can be collected under a new integrated subdirectory. Each still-picture video file may be composed of a single picture.

Figure 6:
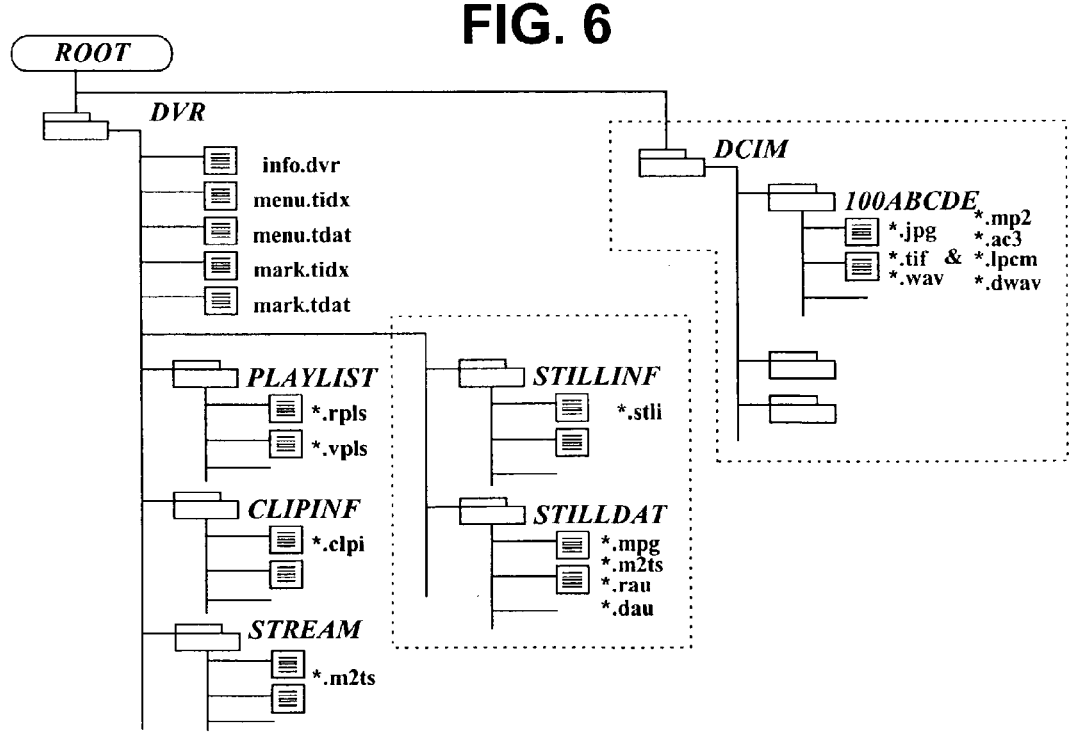

FIG. 6 is a data recording structure of a motion-picture recording medium in accordance with the fourth embodiment of the present invention. This embodiment has a sub file structure for still pictures and audio data that is equivalent to DCF as the first embodiment of FIG. 3.

The fourth embodiment of FIG. 6 is different from the third embodiment of FIG. 5 only in that the audio files (*.mp2, *.ac3, *.lpcm,*.dwav) encoded by MPEG 1 layer 2, AC-3, or LPCM that are DVR's formats as well as wave audio files (*.wav) encoded in PCM, u-Law PCM, or IMA-ADPCM are stored together under subdirectories of the directory 'DCIM'.

That is, audio files, for instance, dubbing audio files linked with picture files are recorded in DVR's recording format below the directory 'DCIM' of DCF structure.

The controller 19 creates a still-picture management file (*.stli) further containing information for search and presentation control of files (*.mpg,*.m2ts,*.rau,*.dau) under the subdirectory 'STILLDAT' and audio files (*.mp2, *.ac3, *.lpcm, *.dwav) below the 'DCIM' directory and records it under the subdirectory 'STILLINF' of the 'DVR' directory.

Figure 7:
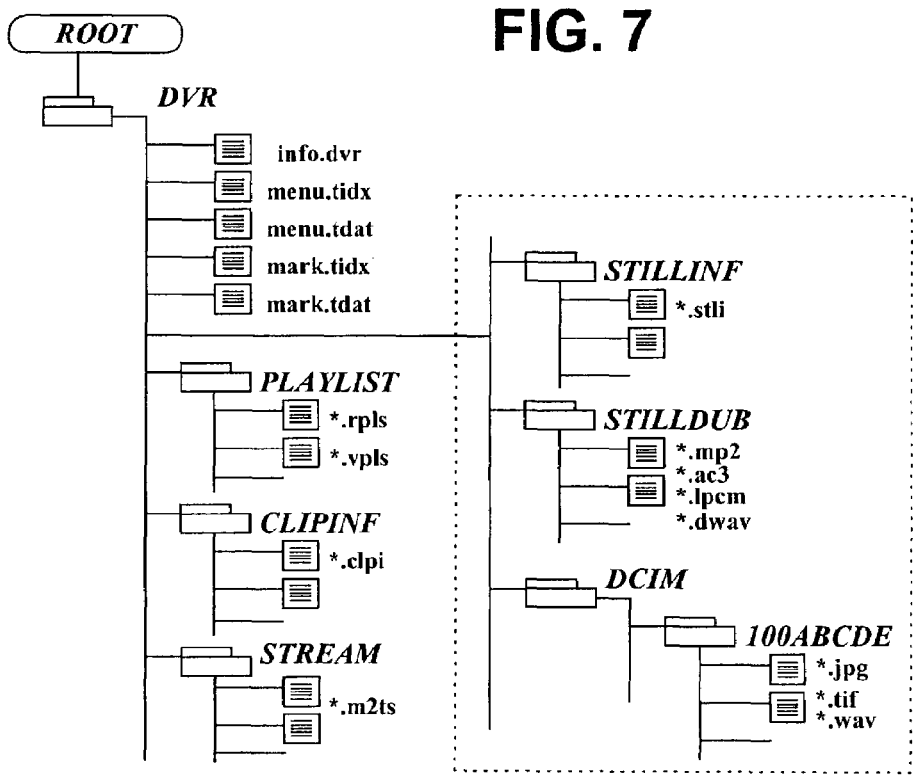

FIG. 7 is a data recording structure of a motion-picture recording medium in accordance with the fifth embodiment of the present invention. This embodiment has a sub file structure for still pictures and audio data that is similar to DCF.

The fifth embodiment of FIG. 7 is different from the first embodiment of FIG. 3 only in that the directory 'DCIM' has been moved under the directory 'DVR' defined for a DVR. Therefore, only path information to point individual still-picture video or audio files is different in a still-picture management file (*.stli) under the subdirectory 'STILLINF' from that of the first embodiment of FIG. 3. In this embodiment, recording and searching operations are conducted the same as in the first embodiment of FIG. 3.

Figure 8:
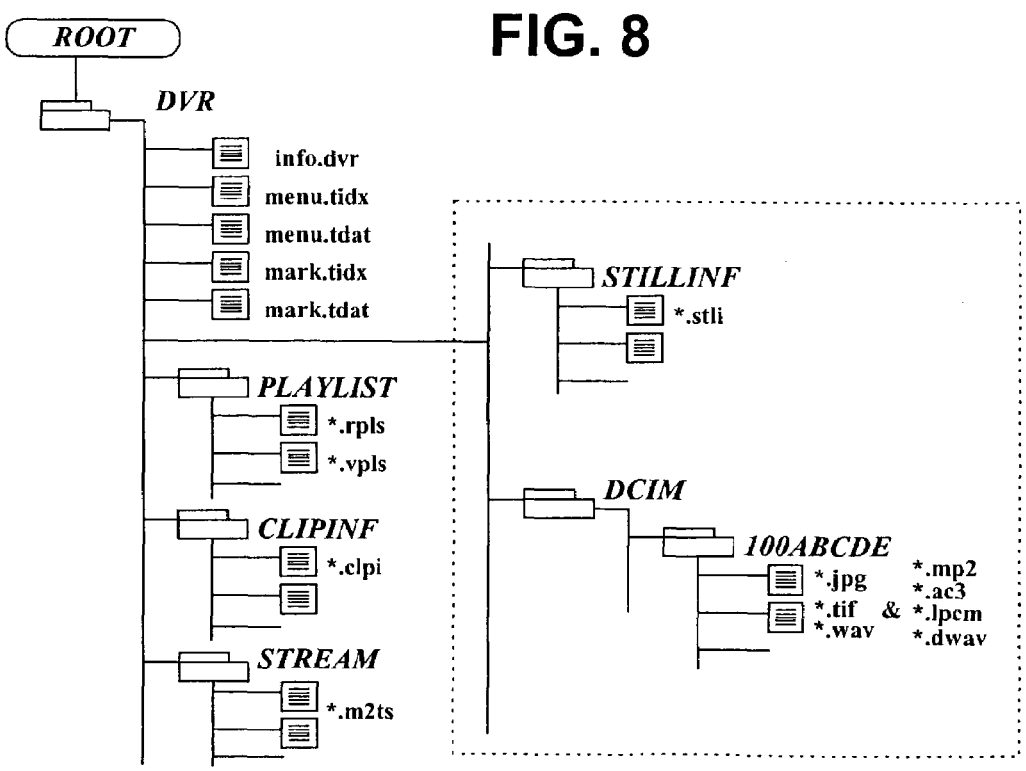

FIG. 8 is a data recording structure of a motion-picture recording medium in accordance with the sixth embodiment of the present invention. This embodiment has a sub file structure for still pictures and audio data that is similar to DCF.

The sixth embodiment of FIG. 8 is different from the second embodiment of FIG. 4 only in that the directory 'DCIM' has been moved under the directory 'DVR' defined for a DVR. Therefore, only path information to point individual still-picture video or audio files is different in a still-picture management file (*.stli) under the subdirectory 'STILLINF' from that of the second embodiment of FIG. 4. In this embodiment, recording and searching operations are conducted the same as in the second embodiment of FIG. 4.

Figure 9:
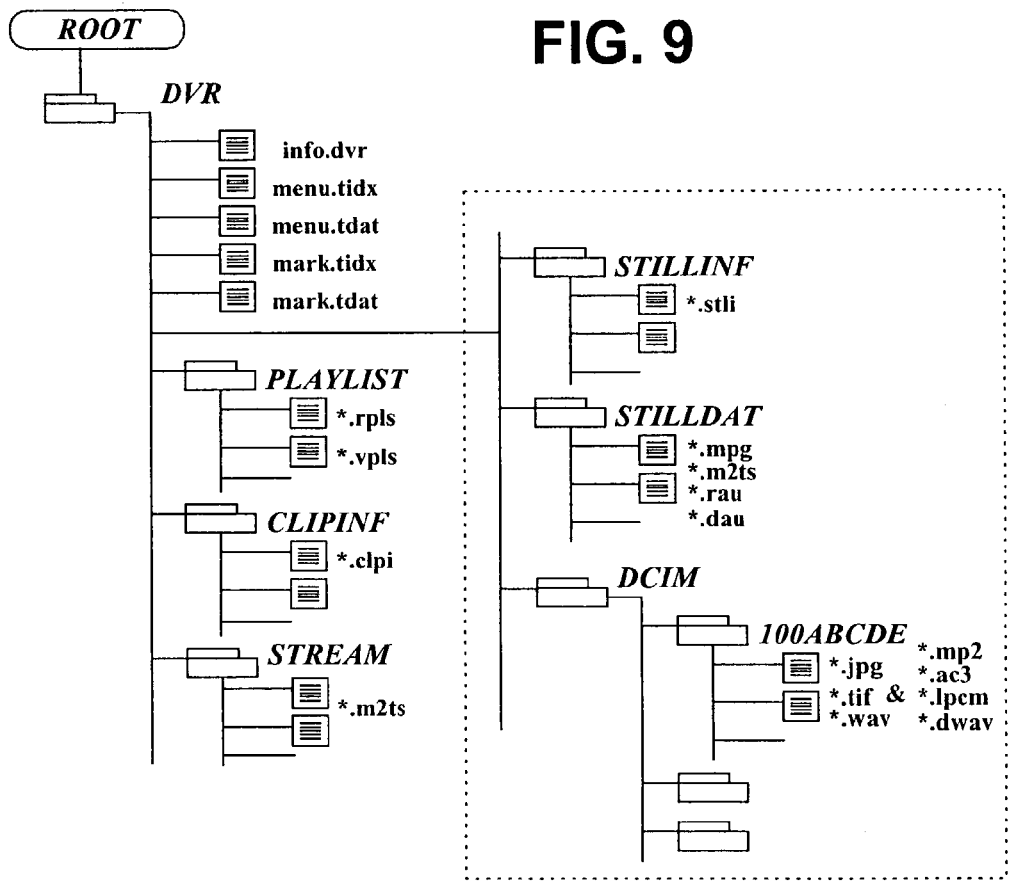

FIG. 9 is a data recording structure of a motion-picture recording medium in accordance with the seventh embodiment of the present invention. This embodiment has a sub file structure for still pictures and audio data that is similar to DCF.

The seventh embodiment of FIG. 9 is different from the fourth embodiment of FIG. 6 only in that the directory 'DCIM' has been moved under the directory 'DVR' defined for a DVR. Therefore, only path information to point individual still-picture video or audio files is different in a still-picture management file (*.stli) under the subdirectory 'STILLINF' from that of the fourth embodiment of FIG. 6. In this embodiment, recording and searching operations are conducted the same as in the fourth embodiment of FIG. 6.

Figure 10:
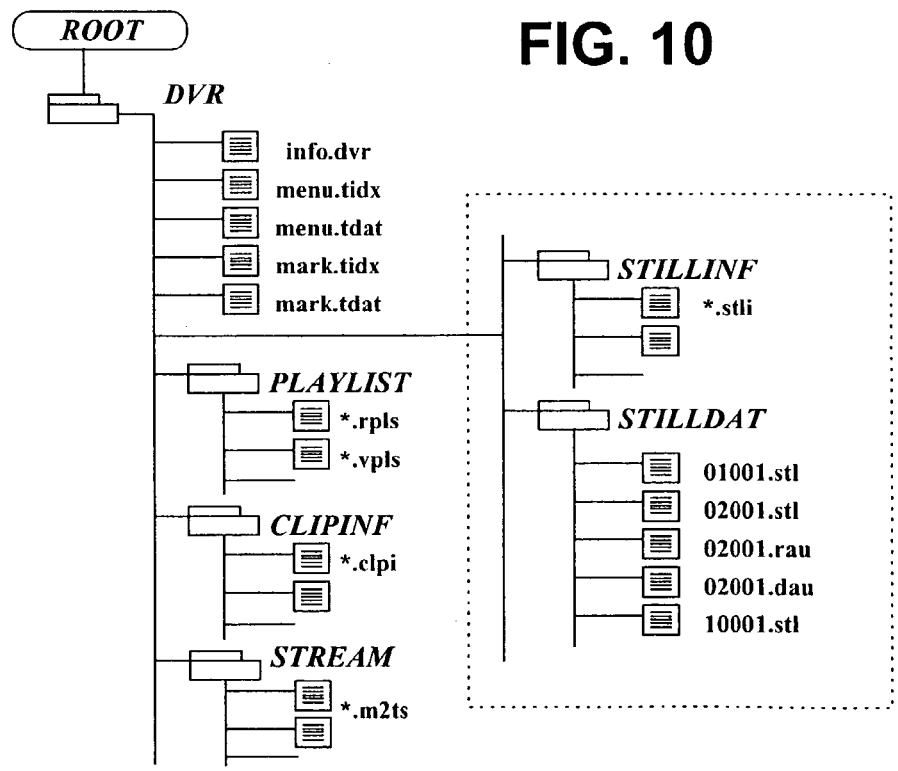

FIG. 10 is a data recording structure of a motion-picture recording medium in accordance with the eighth embodiment of the present invention. This embodiment has a sub file structure for still pictures and audio data that is not matched with DCF.

The eighth embodiment of FIG. 10 is different from the above-explained embodiments in that still picture files, audio files, and/or dubbing audio files are all accommodated in DVR's file structure. That is, still picture files (*.stl), real audio files (*.rau), and dubbing audio files (*.dau) are all included in the subdirectory 'STILLDAT'. Those files are named by a DVR the same as motion-picture files are.

A still-picture video file under the subdirectory 'STILLDAT', e.g., the file '01001.STL' includes all files of JPEG or TIFF format that would be included under a subdirectory, e.g., '100ABCDE' in DCF structure. All still pictures of DVR's format are also included in the subdirectory 'STILLDAT'.

In addition, audio contents of the real audio files (*.rau) and/or the dubbing audio files (*.dau) may be included in the still picture files (*.stl). In this case, the real audio files and the dubbing audio files are not created.

The controller 19 creates a still-picture management file (*.stli) containing information for search and presentation control of still-picture files (*.stl) and audio files (*.rau,*.dau) under the subdirectory 'STILLDAT' and records it under the subdirectory 'STILLINF' of the 'DVR' directory.

Thus, a DVR can search for and present a still-picture video (*.stl), a real-time audio file (*.rau), and/or a dubbing audio file (*.dau) under the subdirectory 'STILLDAT' with reference to the recorded still-picture management file (*.stli) under the subdirectory 'STILLINF' of the directory 'DVR'.

If a still-picture video and/or audio file is selected by a playlist file (*.rpls,*.vpls) containing motion-picture/still-picture play items, that file is searched for and then presented as explained before.

Figure 11:
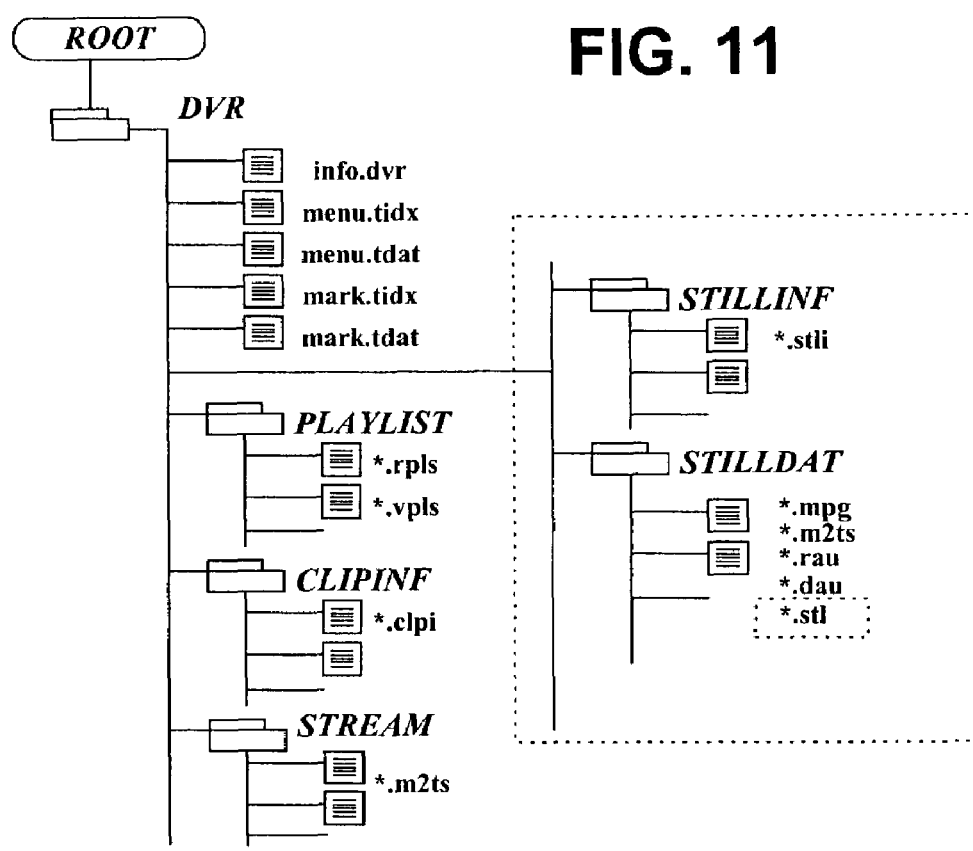

FIG. 11 is a data recording structure of a motion-picture recording medium in accordance with the ninth embodiment of the present invention. This embodiment has a sub file structure for still pictures and audio data that is not matched with DCF.

In this embodiment, still picture files and audio files are recorded altogether under the subdirectory 'STILLDAT' of the directory 'DVR' the same as the eighth embodiment of FIG. 10. However, DVR's still pictures are recorded in the MPEG I-picture format (*.mpg) or MPEG 2 transport stream format (*.m2ts) while still pictures of DSC's format are collected into a file with extension of 'stl'.

Contents of the audio files (*.rau,*.dau) may be included in the DVR-formatted still picture files (*.mpg) or the DSC-formatted still picture files (*.stl).

The controller 19 creates a still-picture management file (*.stli) containing information for search and presentation control of still-picture files (*.stl), real-time audio files (*.rau), dubbing audio files (*.dau), and MPEG-formatted still-picture files (*.mpg) under the subdirectory 'STILLDAT' and records it under the subdirectory 'STILLINF' of the 'DVR' directory.

The above-explained method of recording still pictures onto a rewritable recording medium enables a recording medium with motion-picture data recorded by a DVR to accommodate still picture video and audio files in DSC-compatible file system. Thus, file management, e.g., copying, editing, and so on can be conducted efficiently and conveniently through a single recording medium of very large storage capacity, which results in remarkable improvement of use convenience of a motion picture recorder and a digital still camera.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of recording still pictures onto a recording medium, comprising:

recording first type files under a first directory of the recording medium, the first type files comprising a still picture video file of a first type recording format;

recording second type files under a second directory of the recording medium other than the first directory, the second type files comprising a still picture video file of a second type recording format other than the first type recording format; and recording a management file under the second directory, the management file containing information used to control a presentation of the first type files and the second type files, wherein the first directory is a DCF (Design rule for Camera File system) directory, and the second directory is a DVR directory containing one of a playlist directory, a clip information directory, and a stream directory, the playlist directory including playlist files containing motion-picture and still-picture play items and title management information, the clip information directory including clip information files containing information on movie stream management and movie attributes, and the stream directory including stream files containing actual motion-picture data stream packets.

2. The method of claim 1, wherein the first type files further comprise an audio file corresponding to the still picture video file.

3. The method of claim 1, further comprising:
recording a dubbing audio file associated with the first type files and the second type files under the second directory.

4. The method of claim 1, further comprising:
recording a dubbing audio file associated with the first type files under the first directory, and a dubbing audio file associated with the second type files under the second directory.

5. The method of claim 1, wherein a parent directory of the first and second directory is a root directory.

6. The method of claim 1, wherein the first directory is a child directory of the second directory.

7. An apparatus for recording still pictures onto a recording medium, comprising:
a controller configured to control a recording unit to record first type files under a first directory on the recording medium, the first type files comprising a still picture video file of a first type recording format; to record second type files under a second directory other than the first directory on the recording medium, the second type files comprising a still picture video file of a second type recording format other than the first type recording format; and to record a management file under the second directory on the recording medium, the management file containing information used to control a presentation of the first type files and the second type files, wherein
the first directory is a DCF (Design rule for Camera File system) directory, and
the second directory is a DVR directory containing one of a playlist directory, a clip information directory, and a stream directory, the playlist directory including playlist files containing motion-picture and still-picture play items and title management information, the clip information directory including clip information files containing information on movie stream management and movie attributes, and the steam directory including stream files containing actual motion-picture data stream packets.

8. The apparatus of claim 7, wherein the controller is further configured to control the recording unit to record a dubbing audio file associated with the first type files and the second type files under the second directory on the recording medium.

9. The apparatus of claim 7, wherein the controller is further configured to control the recording unit to record a dubbing audio file associated with the first type files under the first directory on the recording medium, and a dubbing audio file associated with the second type files under the second directory on the recording medium.

10. The apparatus of claim 7, wherein a parent directory of the first and second directory is a root directory.

11. The apparatus of claim 7, wherein the first directory is a child directory of the second directory.

12. An apparatus for reproducing still pictures from a recording medium, comprising:
a controller configured to control a reproducing unit to read a management file from a second directory of the recording medium, the management file including management information containing information used to control a presentation of first type files and second type files; and to reproduce one of the first type files and second type files according to the management information, the first type files being under a first directory of the recording medium, the first type files comprising a still picture video file of a first type recording format, the second type files being under a second directory other than the first directory of the recording medium, the second type files comprising a still picture video file of a second type recording format other than the first type recording format, wherein
the first directory is a DCF (Design rule for Camera File system) directory, and the second directory is a DVR directory containing one of a playlist directory, a clip information directory, and a stream directory, the playlist directory including playlist files containing motion-picture and still-picture play items and title management information, the clip information directory including clip information files containing information on movie stream management and movie attributes, and the stream directory including stream files containing actual motion-picture data stream packets.

13. The apparatus of claim 12, wherein the first type files further comprise an audio file corresponding to the still picture video file.

14. The apparatus of claim 12, wherein the controller is configured to control a presentation of the first type files and the second type files based on the management file and in response to a user input.

15. A recording medium, comprising:
a data file area for storing first type files under a first directory and storing second type files under a second directory other than the first directory, the first type files comprising a still picture video file of a first type recording format, the second type files comprising a still picture video file of a second type recording format other than the first type recording format; and
a management file area for storing a management file under the second directory, the management file containing information used to control a presentation of the first type files and the second type files, wherein
the first directory is a DCF (Design rule for Camera File system) directory, and
the second directory is a DVR directory containing one of a playlist directory, a clip information directory, and a stream directory, the playlist directory including playlist files containing motion-picture and still-picture play items and title management information, the clip information directory including clip information files containing information on movie stream management and movie attributes, and the stream directory including stream files containing actual motion-picture data stream packets.

16. The recording medium of claim 15, wherein the first type files further comprise an audio file corresponding to the still picture video file.

17. The recording medium of claim 15, the data file area further storing a dubbing audio file associated with the first type files and the second type files under the second directory.

18. The recording medium of claim 15, the data file area further storing a dubbing audio file associated with the first type files under the first directory, and a dubbing audio file associated with the second type files under the second directory.

* * * * *